US007741951B2

(12) United States Patent
Fitzgibbon

(10) Patent No.: US 7,741,951 B2
(45) **Date of Patent: *Jun. 22, 2010**

(54) METHOD AND APPARATUS FOR A ROLLING CODE LEARNING TRANSMITTER

(75) Inventor: James J. Fitzgibbon, Batavia, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 1176 days.

This patent is subject to a terminal disclaimer.

(21) Appl. No.: 11/216,224

(22) Filed: Aug. 31, 2005

(65) Prior Publication Data

US 2006/0049914 A1 Mar. 9, 2006

Related U.S. Application Data

(63) Continuation of application No. 09/925,867, filed on Aug. 9, 2001, now Pat. No. 7,057,494.

(51) Int. Cl.
*H04L 9/32* (2006.01)

(52) U.S. Cl. .................... 340/5.23; 340/5.25; 340/5.64; 340/5.71; 340/825.72

(58) Field of Classification Search ................ 340/5.23, 340/5.1, 5.2, 5.21, 5.71, 5.64, 5.22, 827.72, 340/825.2
See application file for complete search history.

(56) References Cited

U.S. PATENT DOCUMENTS 4,241,870 A 12/1980 Marcus
4,247,850 A 1/1981 Marcus
4,490,830 A 12/1984 Kai et al.
4,791,280 A 12/1988 O'Connell et al.
5,416,471 A 5/1995 Treharne et al.

(Continued)

FOREIGN PATENT DOCUMENTS

EP 0 651 119 B1 11/1996

OTHER PUBLICATIONS

Canadian Intellectual Property Office; Examination Report dated Jan. 27, 2009; 4 pgs.

(Continued)

*Primary Examiner*—Vernal U Brown
(74) *Attorney, Agent, or Firm*—Fitch Even Tabin & Flannery

(57) ABSTRACT

A barrier movement operator system having a receiver for receiving, learning and responding to transmitted rolling code type access codes; at least one trained transmitter for operating the system by transmitting a rolling code type access code to the receiver; at least one learning transmitter for learning the rolling code type access code from said trained transmitter in order to operate the system; a controller for evaluating the relationship between the learning transmitter rolling type access code and the trained transmitter rolling type access code; and a device for providing a barrier movement in response to access codes received by the receiver. The barrier movement operator provides a method of learning valid security codes by a security code receiver comprising the steps of receiving a first security code, then within a predetermined period of time receiving a second security code, having a predetermined relationship to the first security code; and storing a representation of the second security code as a valid security code.

12 Claims, 12 Drawing Sheets

U.S. PATENT DOCUMENTS

| | | | | |
|---|---|---|---|---|
| 5,479,155 | A | 12/1995 | Zeinstra et al. | |
| 5,508,694 | A | 4/1996 | Treharne et al. | |
| 5,661,804 | A | 8/1997 | Dykema et al. | |
| 5,686,904 | A | 11/1997 | Bruwer et al. | |
| 5,751,224 | A | 5/1998 | Fitzgibbon | |
| 5,872,513 | A | 2/1999 | Fitzgibbon et al. | |
| 5,949,349 | A | 9/1999 | Farris et al. | |
| 5,969,637 | A | 10/1999 | Doppelt et al. | |
| 6,025,785 | A | 2/2000 | Farris et al. | |
| 6,081,203 | A | 6/2000 | Fitzgibbon | |
| 6,091,343 | A | 7/2000 | Dykema et al. | |
| 6,140,938 | A * | 10/2000 | Flick | 340/825.69 |
| 6,154,544 | A | 11/2000 | Farris et al. | |
| 6,160,488 | A * | 12/2000 | Honda | 340/5.65 |
| 6,188,326 | B1 | 2/2001 | Flick | |
| 6,480,117 | B1 | 11/2002 | Flick | |
| 6,703,941 | B1 | 3/2004 | Blaker | |
| 2002/0034303 | A1 | 3/2002 | Farris et al. | |

OTHER PUBLICATIONS

European Patent Office; Examination Report dated Apr. 1, 2009; 4 pgs.

International Search Report for PCT/US02/25144 of Oct. 2, 2002.

Supplementary European Search Report Dated May 24, 2006 for EP 02 75 7027.

* cited by examiner

METHOD AND APPARATUS FOR A ROLLING CODE LEARNING TRANSMITTER

CROSS-REFERENCE TO RELATED APPLICATION

This application is a continuation of prior application Ser. No. 09/925,867, filed Aug. 9, 2001, now U.S. Pat. No. 7,057,494, which is hereby incorporated herein by reference in its entirety.

BACKGROUND

The present invention relates to barrier moving operators, such as garage door operators, and, more particularly, to learning new security codes to the operator.

A barrier moving operator usually comprises a barrier moving unit, or opener, such as a controlled motor, and intelligent activation and safety devices. The opener is typically activated in response to an access code transmitted from a remote transmitter. RF signaling is the most common means of transmitting the access codes.

Many barrier moving systems, for example, garage door operators use codes to activate the system which change after each transmission. Such varying codes, called rolling codes, are created by the transmitter and acted on by the receiver, both of which operate in accordance with the same method to predict a next access code to be sent and received. A known rolling type access code includes four portions, such as a fixed transmitter number identification portion, a rolling code portion, a fixed transmitter type identification portion, and a fixed switch identification portion. The fixed transmitter identification is a unique transmitter identification number. The rolling portion is a number that changes every transmission in order to confirm that the transmission is not a recorded transmission. The type identification is used to notify the barrier moving operator of the type and features of the transmitter. The switch identification is used to identify which switch on the transmitter is being pressed. There are systems where the function performed is different depending on which switch is pressed.

When the garage door operator is installed, the homeowner receives at least one handheld transmitter that is already trained into the operator. In order to operate the door from a new learning transmitter, there is a two-step learning procedure for training the new learning transmitter. First step is to teach the learning transmitter the type and potentially the code of the owner's handheld transmitter. While holding the handheld transmitter a few inches from the learning transmitter, pressing and holding the handheld transmitter's button active and at the same time pressing the button on the learning transmitter, the owner teaches the access code type and frequency to the learning transmitter. The second step of the learning process is to train the learning transmitter to the operator. To do this, the learn button on the overhead operator has to be pressed, and within 30 seconds the learning transmitter should be activated.

The car manufacturers presently provide learning transmitters permanently mounted within a car. When the homeowner purchases a car with a learning transmitter, the two-step procedure for the rolling code type transmitter system must be performed in order to get the new learning transmitter to operate the owner's garage door operator. There is a problem due to the fact that the homeowners usually do not know that there is a learn button on their garage door operator, and secondly, it is troublesome to get up on a ladder to activate the button on the overhead garage door operator, and then within 30 second to send transmission to the operator, especially in the case of a car built-in learning transmitter.

Also, presently, when the first step of learning of the code by the learning transmitter is performed from the owner's handheld transmitter, the learning transmitter information does not have any correlations with the handheld transmitter code. In this case any automatic learning system is in jeopardy of reducing the security of the system. If an auto learn system, which does not provide a correlation portion for the code trained into the learning transmitter is used, a code from any transmitter could be trained into a learning transmitter and then to the door opener to operate the door. So, there is a need to provide a higher level of security for the learning process.

Therefore, a need exists for an easier method for training a barrier movement operator to learn a rolling code from a newly trained learning transmitter, and to provide a higher security level for the operator system.

SUMMARY

This need is met and the objects are achieved with the present invention.

As described herein, a barrier movement operator provides a method of learning of valid security codes by a security code receiver comprising steps of receiving a first security code, then within a predetermined period of time receiving a second security code, having a predetermined relationship to the first security code; and storing a representation of the second security code as a valid security code.

When used for a barrier movement operator, the method for automatically learning a rolling type access code from a learning transmitter comprises steps of receiving from a first original transmitter a first rolling type access code to move the barrier, the code having a fixed identification portion recognized by the operator; saving the code received from the first transmitter in the operator, at the same time training the learning transmitter by receiving the first rolling type access code from the pre-trained transmitter and storing a representation of the first rolling type access code; then, within a predetermined period of time from receiving the first rolling type access code, sending to the operator a second rolling type access code from the learning transmitter. The second rolling type access code received from the learning transmitter is compared with the first rolling type access code or codes saved in the operator, and, if a predetermined relationship exists between the first rolling type access code and the second rolling type access code, the operator stores the representation of the second rolling type access code from the learning transmitter.

The predetermined relationship is represented by a correlation between the codes, such as the fixed identification portion recognized by the operator, which portion is received from the first transmitter and is stored in the learning transmitter as part of the second rolling type access code. It is desirable that the second rolling type access code is next in sequence to the first rolling code access code saved in the operator. The fixed identification portion in the preferred embodiment is a transmitter number identification portion, however, it also may be a transmitter type identification portion.

In order to provide a higher security, in another embodiment of the present invention, during the first receiving step, after operator receives the first access code for moving the barrier, the operator further receives a signal from the first transmitter to stop the barrier on a mid-travel level, and this barrier position is recorded as a starting point for the learning mode.

Also for security purposes, another embodiment includes that prior to receiving a first transmitter access code by the operator, a barrier is closed while the first transmitter and the learning transmitter are placed between the barrier and the barrier movement operator, for example inside the garage. Then the operator receives the first access code from the first transmitter to open the barrier, and soon after this transmission the operator receives a signal to stop the barrier on a mid-travel level. This barrier position is recorded as a starting point for a learning mode. The rolling type access code from the learning transmitter is stored by the operator only if the duration of the learning mode is within some predetermined time limits.

Another embodiment of the method of the present invention includes steps of receiving a first rolling type access code by the operator from a trained transmitter, moving the barrier in response to the access code, setting an auto learn mode for the operator and saving the first rolling type access code in the operator; within a predetermined time limits receiving a new transmitter rolling type access code by the operator, the new transmitter being trained by the trained transmitter to store a representation of the first rolling type access code; and saving the new transmitter rolling type access code in the operator, if both the new transmitter rolling type access code and the first access code saved in the operator have a correlated fixed identification portion, recognizable by the operator, the new transmitter rolling code is next in sequence to the first rolling code saved in the operator, and the duration of the auto learn mode is within predetermined time limits.

A barrier movement operator system providing a learning method according to present invention comprises a receiver for receiving, learning and responding to transmitted rolling code type access codes; at least one trained transmitter for operating the system by transmitting a rolling code type access code to the receiver, the rolling code including a fixed identification portion recognized by the system; at least one learning transmitter for learning the rolling code type access code from said trained transmitter in order to operate the system; a controller for evaluating relationship between a learning transmitter rolling type access code and a trained transmitter rolling type access code; and a device for providing a barrier movement in response to access codes received by the receiver, wherein the controller is a programmable microcontroller, and the system may include a timer to run the duration of the auto learn mode, which is the time between the last operation of the barrier by the trained transmitter and the receipt by the system of a rolling access code from the learning transmitter, comprising a recognized fixed identification portion.

Another embodiment of the present invention represented a method for modifying a rolling type operation code for a barrier movement operator, comprising steps of receiving a first rolling type operation code from the learning transmitter by the operator; saving the first rolling type operation code in the operator; modifying a rolling type operation code of the learning transmitter; within a predetermined period of time from the first receiving step, receiving a second modified rolling type operation code from the learning transmitter , the second code having a predetermined relationship with the first code; and storing the second modified rolling type operation code in the operator. This method can use both modified type identification portion and switch identification portion.

DETAILED DESCRIPTION

Figure 1:
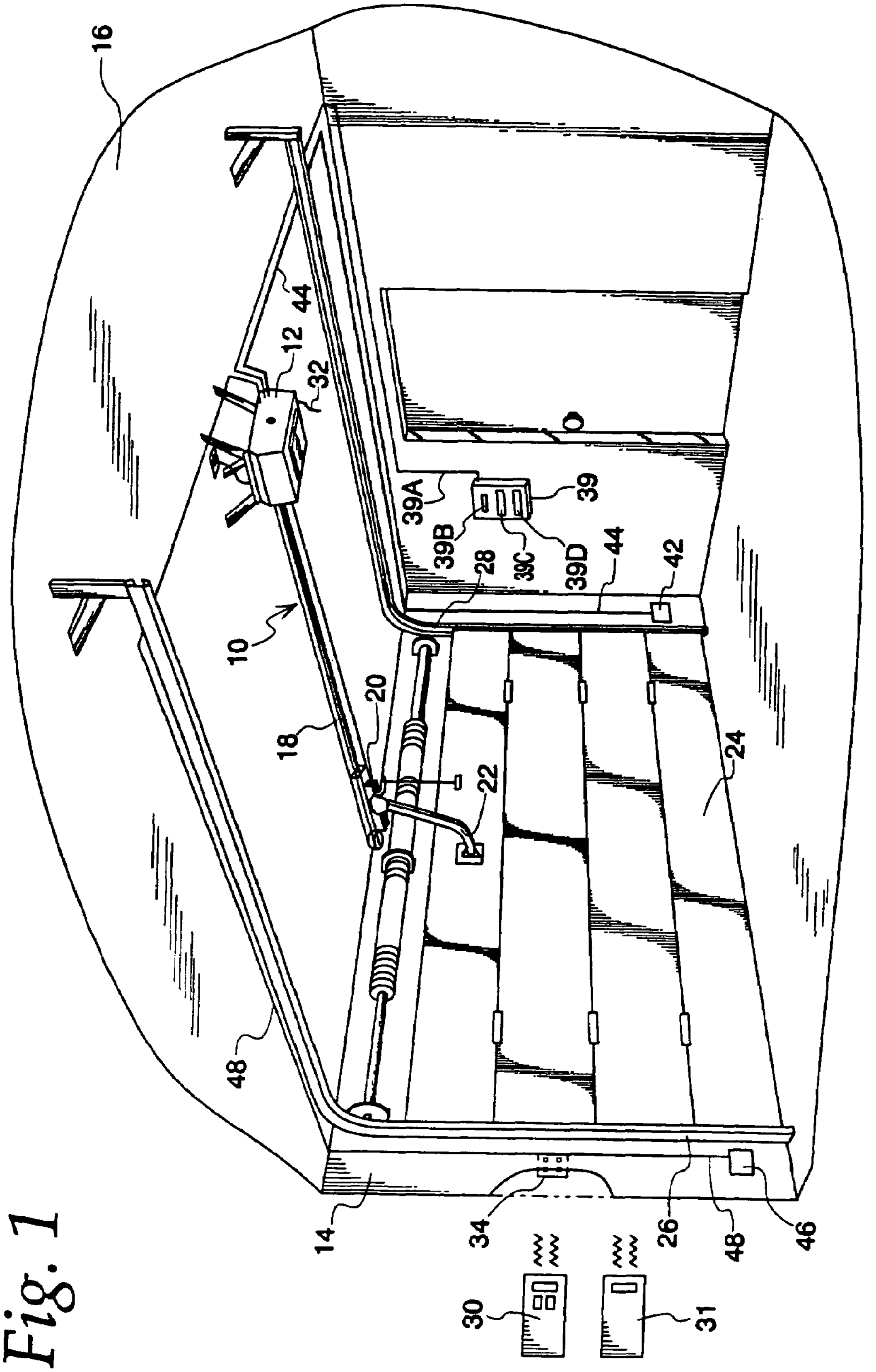
FIG. 1 is a perspective view of a garage having mounted within it a garage door operator embodying the present invention.

Referring now to the drawings and especially to FIG. 1, more specifically a movable barrier door operator, or garage door operator is generally shown therein and referred to by numeral 10 includes a head unit 12 mounted within a garage 14. A barrier moving activating receiver 80 (shown in FIG. 2) includes a routine for responding to rolling access codes. The access code routine, when used with other routines and apparatus of the system, is capable of properly learning and responding to received access codes. An access code learning device of the receiver 80 (shown in FIG. 2) enables an access code learning mode of operation. When the access code learning mode is entered and a rolling access code is first received and learned, the rolling access routine is executed to control the opener and to learn new rolling access codes. More specifically, the head unit 12 is mounted to the ceiling 16 of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to the receiver 80 (shown in FIG. 2) as will appear hereinafter, and a learning transmitter 31. In this description the transmitter 30, which is the transmitter already known to the operator, is called the original transmitter, and the transmitter 31 is called the learning transmitter. An external control pad 34 is positioned on the outside of the garage having a plurality of buttons thereon and communicate via radio frequency transmission with an antenna 32 of the head unit 12. A switch module 39 is mounted on a wall of the garage. The switch module 39 is connected to the head unit 12 by a pair of wires 39A. The switch module 39 includes a light switch 39B, a lock switch 39C and a command switch 39D. An optical emitter 42 is connected via a power and signal line 44 to the head unit 12. An optical detector 46 is connected via a wire 48 to the head unit 12.

Figure 2:
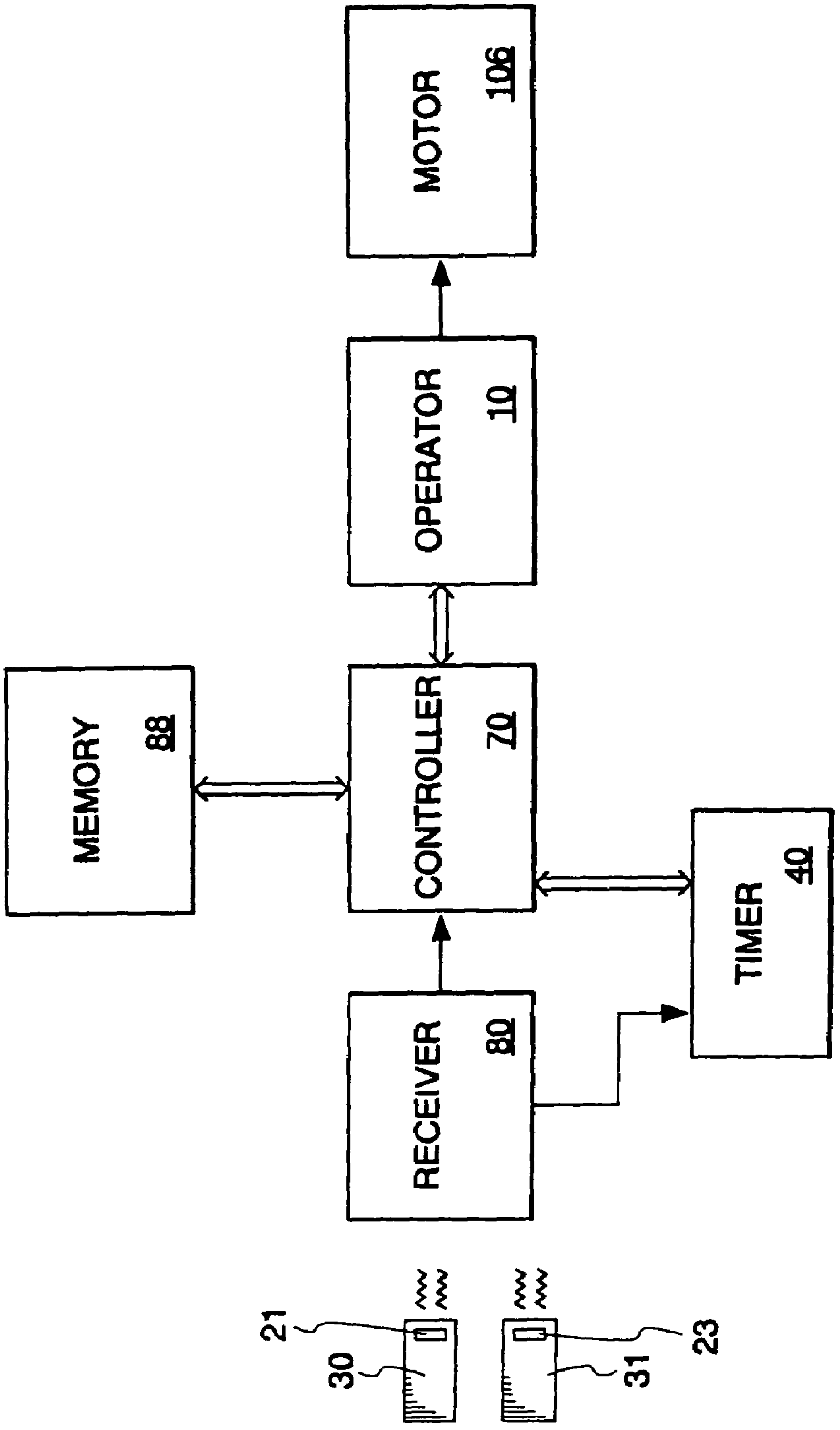
FIG. 2 is a block diagram of the auto learn system.

FIG. 2 represents a block diagram for the auto learn system. The original transmitter 30 is placed in a close proximity to a learning transmitter 31, both of them being within a transmission range of a barrier movement operator 10. The auto learn mode begins with entering pressing the normal transmit button 21 of the original transmitter 30, sending an access code to the operator 10. The operator 10 responds to the received access code and saves the transmitted access code information in the memory 88, at the same time saving the time of setting in the timer 40. The exact mode of entering the learning mode at the receiver depends upon the type of the receiver used. Training the rolling type access code to the learning transmitter 31 from the original transmitter 30 in the present embodiment is provided by pressing the button 23 of the learning transmitter 31 while holding the operation button 21 of the original transmitter 30 and then releasing both buttons. The activation of the learning transmitter at the operator begins by sending a rolling code transmission from the learning transmitter 31 to the receiver 80. The rolling code received from the learning transmitter 31 is identified by the receiver 80 as coming from a learning transmitter. The received rolling code is compared by the controller 70 with the previously saved transmitter information and analyzed for correlation with the access code from the original transmitter. In the preferred embodiment the correlation is represented by the fixed transmitter number identification portion. This fixed transmitter number identification became a portion of the learning transmitter access code, confirming that the learning transmitter was trained by the original transmitter 30 having a transmitter identification number recognized by the system. Then, if the timer shows that the time of the auto learn process is within some predetermined time limits, e.g. 30 seconds, and if the rolling code from the learning transmitter is next in sequence to the saved original transmitter rolling code, the memory 88 stores the learning transmitter access code. Thereafter the operator will recognize access codes from the learning transmitter 31 as proper access codes.

In the preferred embodiment the fixed transmitter identification portion is chosen for correlation because it represents a unique transmitter number showing that the known original transmitter was the unit used to train the learning transmitter. Also, in another embodiment the transmitter type identification portion is used for correlation, and likewise any other fixed identification portion of the code may be used for this purpose.

Another potential use for this auto learn system is that new codes can be generated having unique operation features. Both the type identification, and the switch identification can be modified to create unique known transmitted code. If a code for the first switch identification is used to operate the operator, there are two more auto-learned codes that can be used for other features. One strong potential is to have a code for an open command only. Another potential is to use a code for a closed command only.

Figure 3:
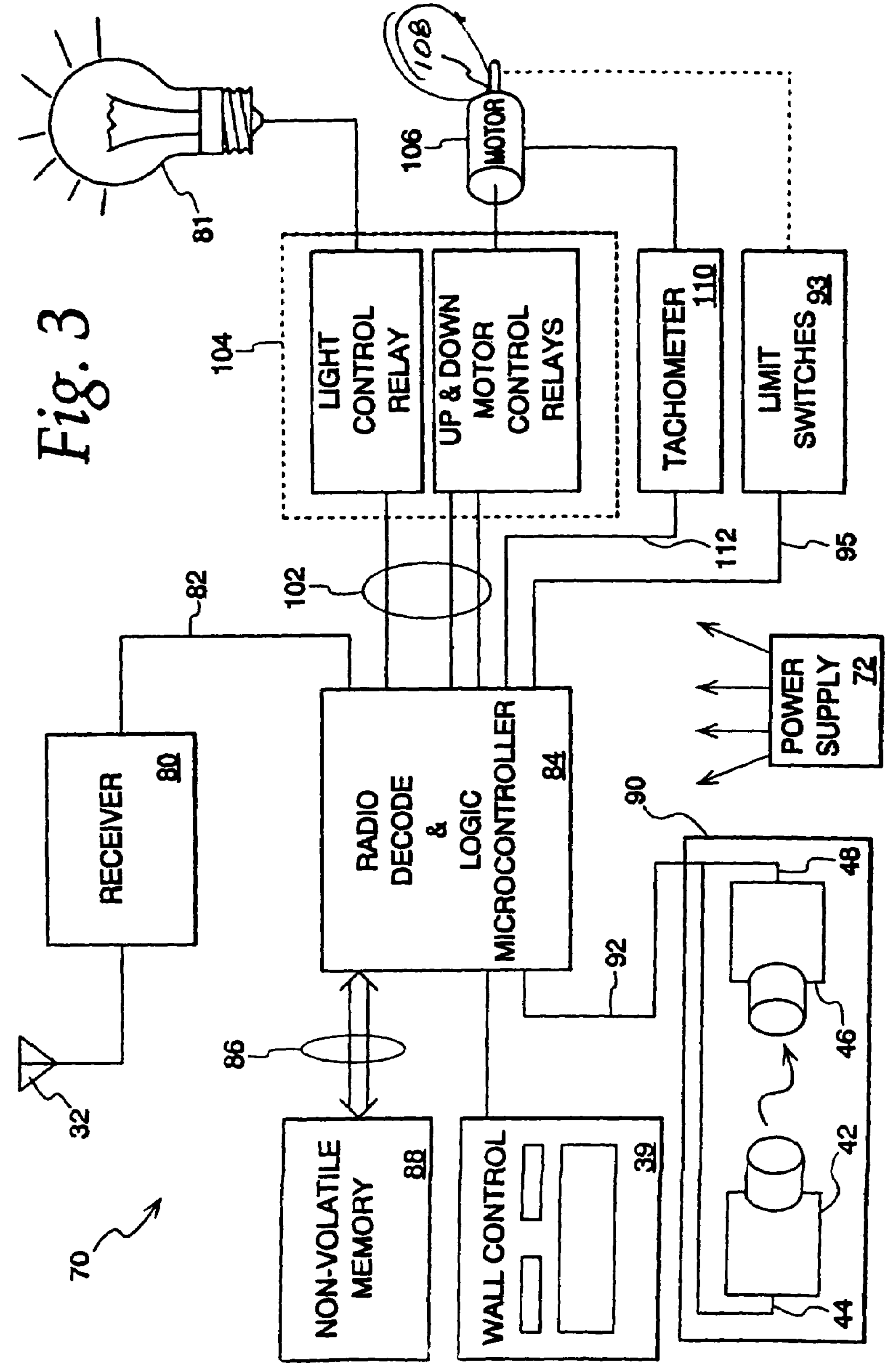
FIG. 3 is a block diagram of a controller mounted within the head unit of the garage door operator employed in the garage door operator shown in FIG. 1.

The garage door operator 10 with the head unit 12 is shown in FIG. 3. It has a controller 70 and antenna 32. The controller 70 includes a power supply 72 which receives alternating current from an alternating current source, such as 110 volt AC, and converts the alternating current to required levels of DC voltage. The controller 70 also includes a super-regenerative receiver 80 (shown in FIG. 5) coupled via a line 82 (shown in FIG. 6A) to supply demodulated digital signals to a microcontroller 84. The receiver 80 is energized by the power supply 72. The microcontroller is also coupled by a bus 86 to a non-volatile memory 88, which non-volatile memory stores user codes, and other digital data related to the operation of the control unit. An obstacle detector 90, which comprises the emitter 42 and infrared detector 46 is coupled via an obstacle detector bus 92 to the microcontroller. The obstacle detector bus 92 includes lines 44 and 48. The wall switch 39 is connected via the connecting wires 39*a* to the microcontroller 84. The microcontroller 84, in response to switch closures and received codes, will send signals over a relay logic line 102 to a relay logic module 104 connected to an alternating current motor 106 having a power take-off shaft 108 coupled to the transmission 18 of the garage door operator 10. A tachometer 110 is coupled to the shaft 108 and provides an RPM signal on a tachometer line 112 to the microcontroller 84; the tachometer signal being indicative of the speed of rotation of the motor. The apparatus also includes up limit switches 93*a* and down limit switches 93*b*, which respectively sense when the door 24 is fully open or fully closed. The limit switches are shown in FIG. 3 as a functional box 93 connected to microcontroller 84 by leads 95.

Although the controller 70 is capable of receiving and responding to a plurality of types of code transmitters such as the multibutton rolling code transmitter 30, single button fixed code transmitter and keypad type door frame mount transmitter (called keyless), the present embodiments describes its use with rolling code type transmitter systems.

Figure 4:
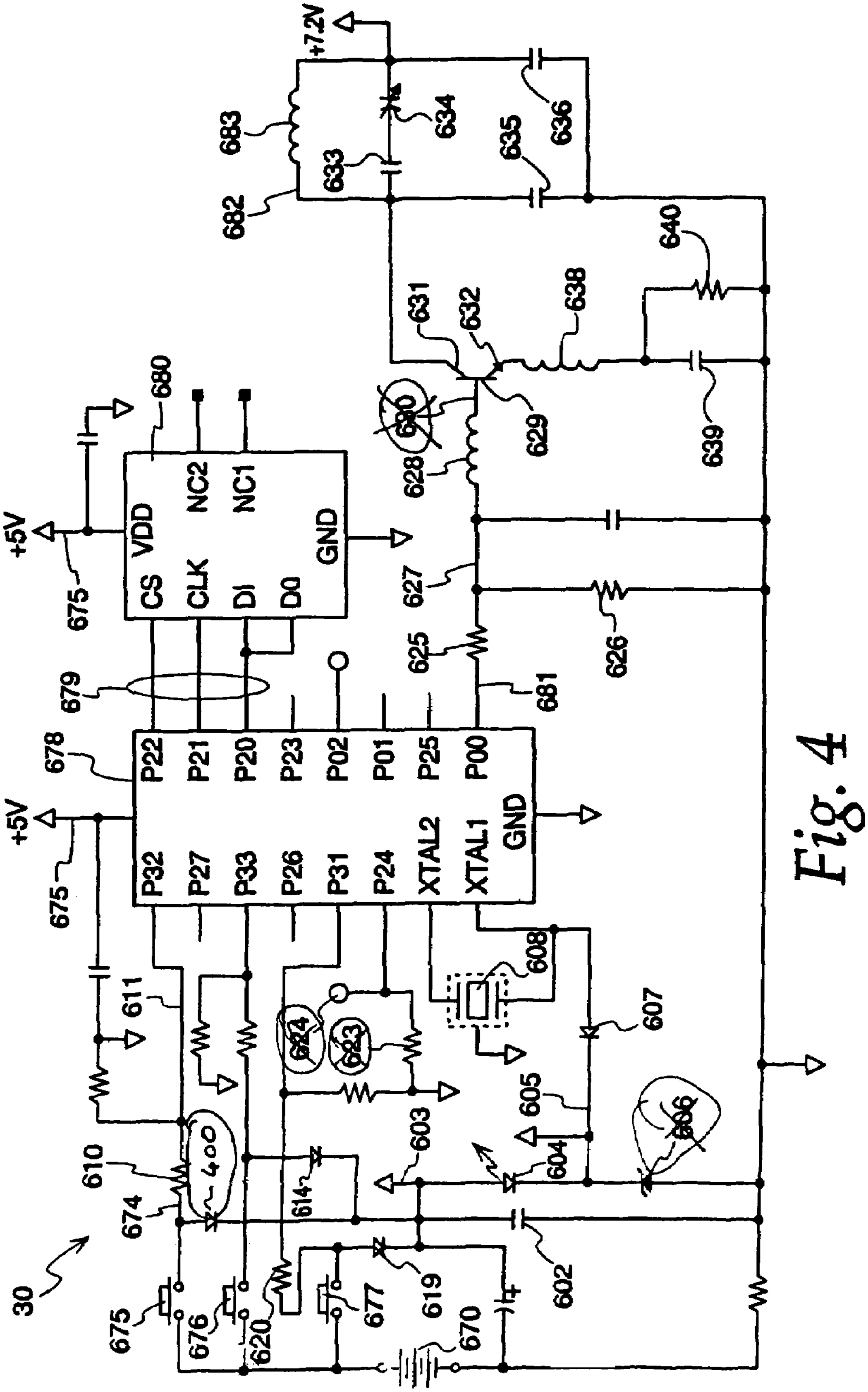
FIG. 4 is a circuit diagram of a rolling code transmitter.

Referring now to FIG. 4, the original transmitter 30 is shown therein and includes a battery 670 connected to three pushbutton switches 675, 676 and 677. When one of the pushbutton switches is pressed, a power supply at 674 is enabled, which powers the remaining circuitry for the transmission of security codes. The primary control of the transmitter 30 is performed by a microcontroller 678, which is connected by a serial bus 679 to a non-volatile memory 680, including a chip select port, a clock port and a DI port to which and from which serial data may be written and read and to which addresses may be applied. An output bus 681 connects the microcontroller to a radio frequency oscillator 682. The microcontroller 678 produces coded signals when a button 675, 676 or 677 is pushed causing the output of the RF oscillator 682 to be amplitude modulated to supply a radio frequency signal at an antenna 683 connected thereto. When switch 675 is closed, power is supplied through a diode 600 to a capacitor 602 to supply a 7.1 volt voltage at a lead 603 connected thereto. A light emitting diode 604 indicates that a transmitter button has been pushed and provides a voltage to a lead 605 connected thereto. The voltage at conductor 605 is applied via a conductor 675 to power microcontroller 678, which is a Zilog Z86C233 8-bit in this embodiment. The signal from switch 675 is also sent via a resistor 610 through a lead 611 to a P32 pin of the microcontroller 678. Likewise, when a switch 676 is closed, current is fed through a diode 614 to the lead 603 also causing the crystal 608 to be energized, powering up the microcontroller at the same time that pin P33 of the microcontroller is pulled up. Similarly, when a switch 677 is closed, power is fed through a diode 619 to the crystal 608 as well as pull up voltage being provided through a resistor 620 to the pin P31.

The microcontroller 678 produces output signals at the lead 681, which are supplied to a resistor 625 which is coupled to a voltage dividing resistor 626 feeding signals to the lead 627. A 30-nanohenry inductor 628 is coupled to an NPN transistor 629 at its base 620. The transistor 629 has a collector 631 and an emitter 632. The collector 631 is connected to the antenna 683, which, in this case, comprises a printed circuit board, loop antenna having an inductance of 25-nanohenries, comprising a portion of the tank circuit with a capacitor 633, a variable capacitor 634 for tuning, a capacitor 635 and a capacitor 636. A 30-nanohenry inductor 638 is coupled via a capacitor 639 to ground. The capacitor has a resistor 640 connected in parallel with it to ground. When the output from lead 681 is driven high by the microcontroller, the capacitor Q1 is switched on causing the tank circuit to output a signal on the antenna 683. When the capacitor is switched off, the output to the tank circuit is extinguished causing the radio frequency signal at the antenna 683 also to be extinguished.

Figure 7:
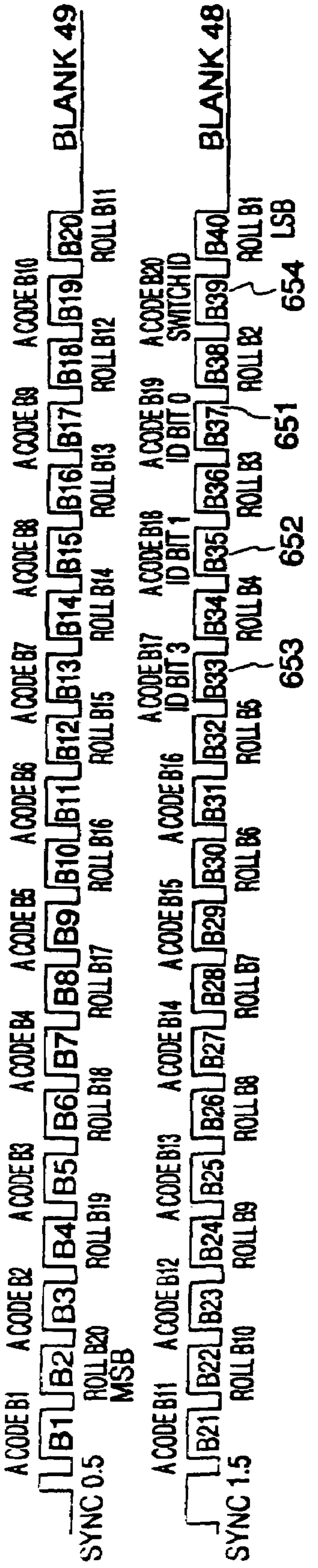
FIG. 7 is a representation of codes transmitted by the rolling code transmitter of FIG. 4.

Microcontroller 678 reads a value from nonvolatile memory 680 and generates therefrom a 20-bit (trinary) rolling code. The 20-bit rolling code is interleaved with a 20-bit fixed code stored in the nonvolatile memory 680 to form a 40-bit (trinary) code as shown in FIG. 7. The "fixed" code portion includes 3 bits 651, 652 and 653 (FIG. 8) which identify the type of transmitter sending the code and a function bit 654. Since bit 654 is a trinary bit, it is used to identify which of the three switches, 675, 676 or 677 was pushed.

Figure 8A:
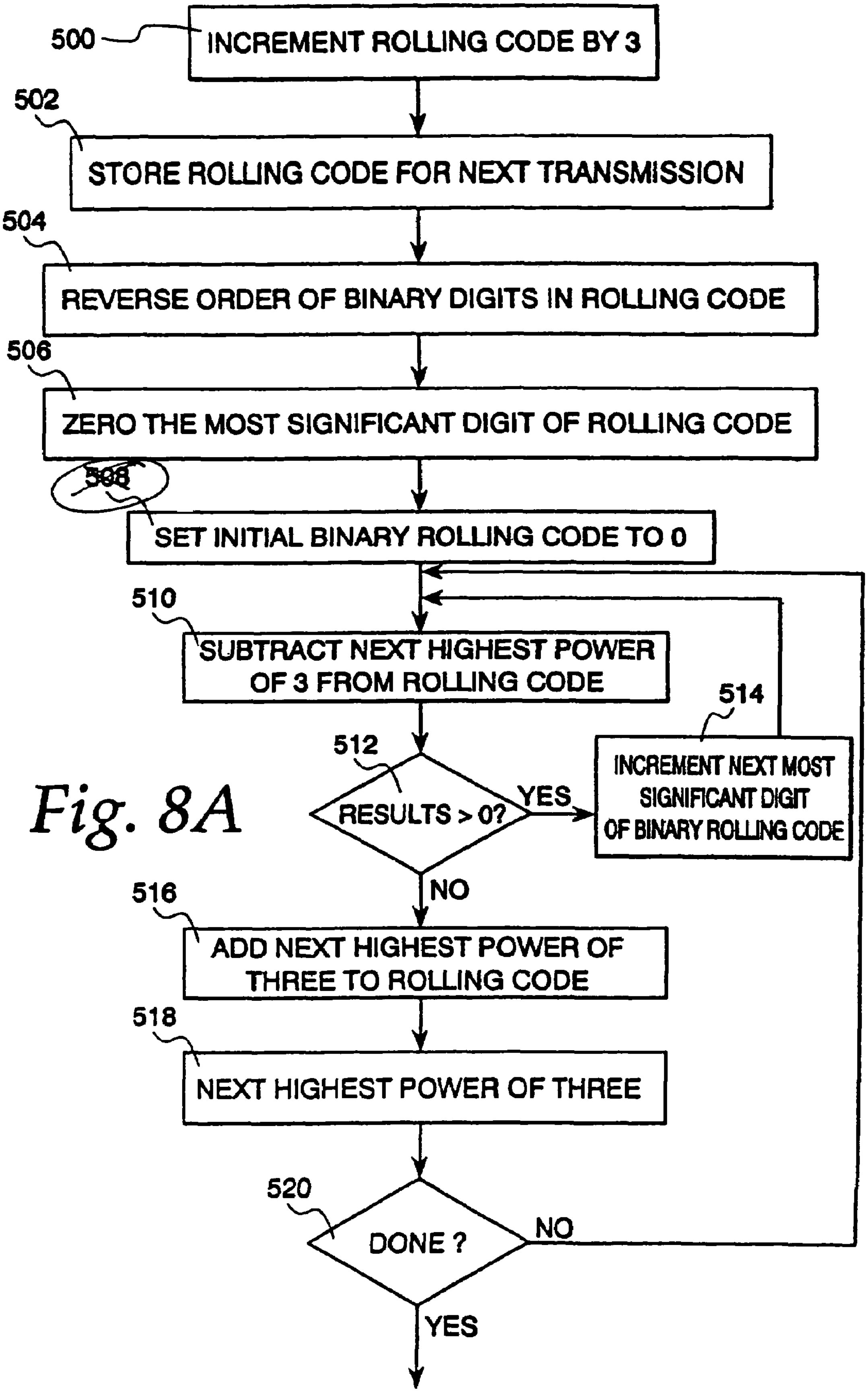
FIGS. 8A-8B are flow diagrams of the operation of the rolling code transmitter of FIG. 4.
Figure 8B:
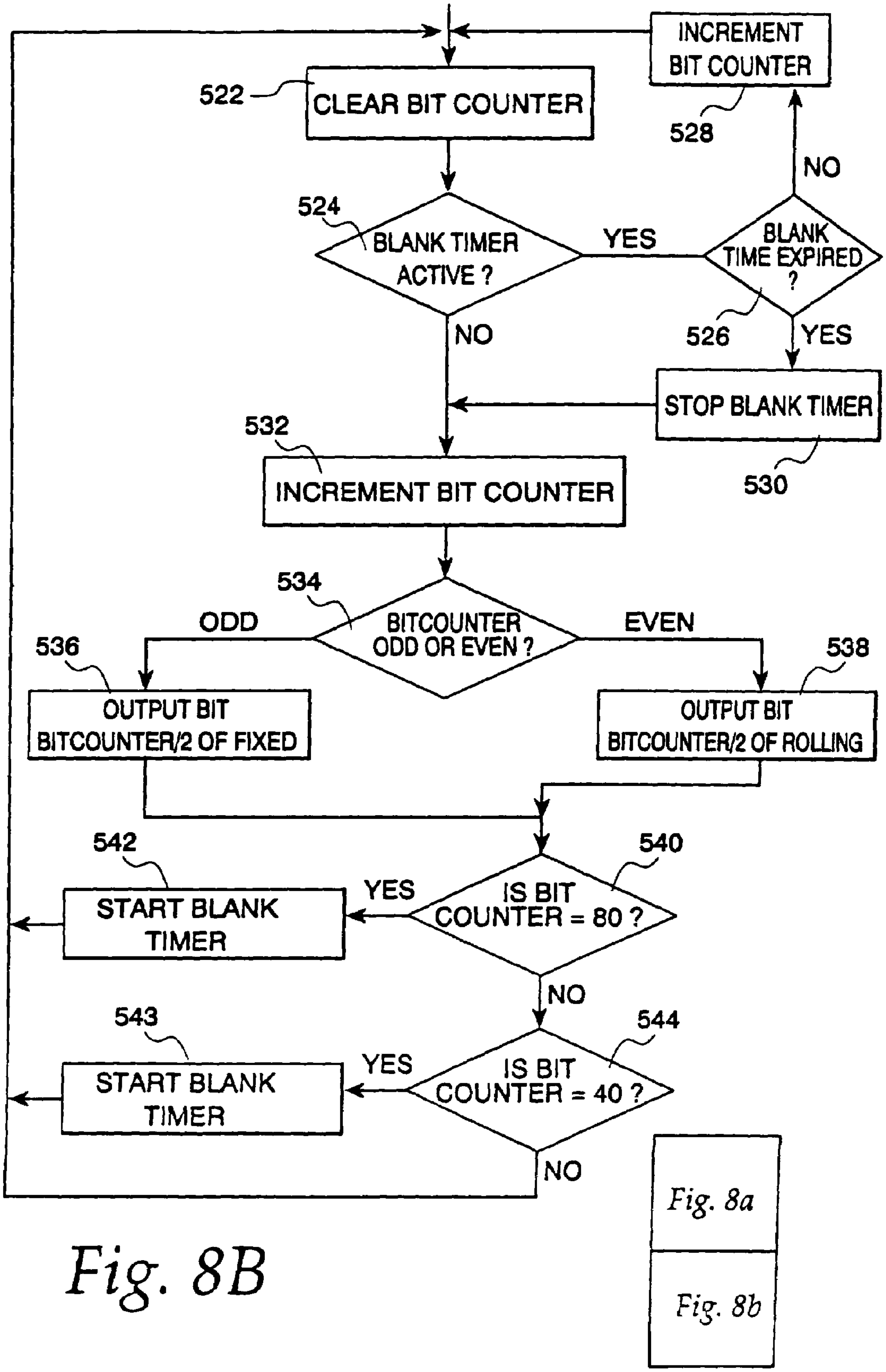

Referring now to FIGS. 8A-8B, the flow chart set forth therein describes the operation of the original transmitter 30. A rolling code from non-volatile memory is incremented by three in step 500, followed by the rolling code being stored (step 502) for the next transmission from the transmitter when a transmitter button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code is set to 0. It may be appreciated that it is trinary code, which is actually used to modify the radio frequency oscillator signal and the trinary code is best seen in FIG. 7. It may be noted that the bit timing in FIG. 7 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is equal to zero. If it is, the next most significant digit of the binary rolling code is incremented in a step 514, following which flow is returned to the step 510. If the result is not greater than 0, the next highest power of 3 is added to the rolling code in the step 516. In the step 518, another highest power of 3 is incremented and in a step 520, a test is determined as to whether the rolling code is completed. If it is not, control is transferred back to step 510. If it has, control is transferred to step 522 to clear the bit counter. In a step 524, the blank timer is tested to determine whether it is active or not. If it is not, a test is made in a step 526 to determine whether the blank time has expired. If the blank time has not expired, control is transferred to a step 528 in which the bit counter is incremented, following which control is transferred back to the decision step 524. If the blank time has expired as measured in decision step 526, the blank timer is stopped in a step 530 and the bit counter is incremented in a step 532. The bit counter is then tested for odd or even in a step 534. If the bit counter is not even, control is transferred to a step 536 where the bit of the fixed code bit counter divided by 2 is output. If the bit counter is even, the rolling code bit counter divided by 2 is output in a step 538. By the operation of 534, 536 and 538, the rolling code bits and fixed code bits are alternately transmitted. The bit counter is tested to determine whether it is set to equal to 80 in a step 540. If it is, the blank timer is started in a step 542. If it is not, the bit counter is tested for whether it is equal to 40 in a step 543. If it is, the blank timer is tested and is started in a step 543. If the bit counter is not equal to 40, control is transferred back to step 522.

Figure 5:
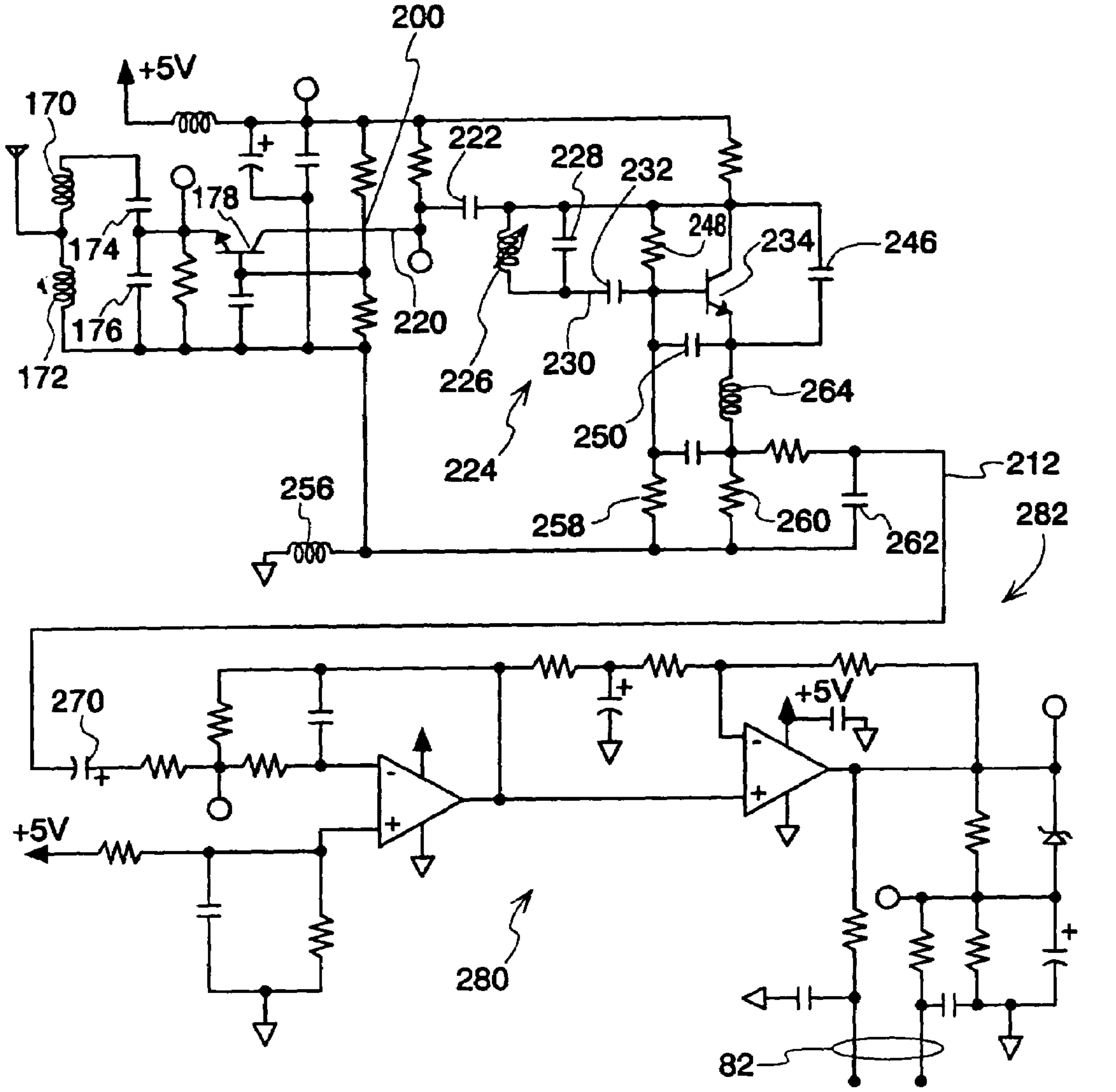
FIG. 5 is a detailed circuit description of the radio receiver used in the system.

The receiver 80 is shown in detail in FIG. 5. RF signals may be received by the controller 70 at the antenna 32 and fed to the receiver 80. The receiver 80 includes a pair of inductors 170 and 172 and a pair of capacitors 174 and 176 that provide impedance matching between the antenna 32 and other portions of the receiver. An NPN transistor 178 is connected in common base configuration as a buffer amplifier. The RF output signal is supplied on a line 220, coupled between the collector of the transistor 178 and a coupling capacitor 222. The buffered radio frequency signal is fed via the coupling capacitor 222 to a tuned circuit 224 comprising a variable inductor 226 connected in parallel with a capacitor 228. Signals from the tuned circuit 224 are fed on a line 230 to a coupling capacitor 232 which is connected to an NPN transistor 234 at its base. The collector 240 of transistor 234 is connected to a feedback capacitor 246 and a feedback resistor 248. The emitter is also coupled to the feedback capacitor 246 and to a capacitor 250. A choke inductor 256 provides ground potential to a pair of resistors 258 and 260 as well as a capacitor 262. The resistor 258 is connected to the base of the transistor 234. The resistor 260 is connected via an inductor 264 to the emitter of the transistor 234. The output signal from the transistor is fed outward on a line 212 to an electrolytic capacitor 270.

As shown in FIG. 5, the capacitor 270 couples the demodulated radio frequency signal from transistor 234 to a bandpass amplifier 280 to an average detector 282. An output of the bandpass amplifier 280 is coupled to pin P32 of a Z86233 microcontroller 85. Similarly, an output of average detector 282 is connected to pin P33 of the microcontroller. The microcontroller is energized by the power supply 72 and also controlled by the wall switch 39 coupled to the microcontroller by the lead 39*a*. Pins P30 and P03 of microcontroller 85 are connected to obstacle detector 90 via conductor 92. Obstacle detector 90 transmits a pulse on conductor 92 every 10 milliseconds when the infrared beam between sender 42 and receiver has not been broken by an obstacle. When the infrared beam is blocked, one or more pulses will be skipped by the obstacle detector 46. Microcontroller scans the signal on conductor 92 every 1 millisecond to determine if a pulse has been received in the last 12 milliseconds. When a pulse has not been received, an obstacle is assumed and appropriate action may be taken.

Figure 6A:
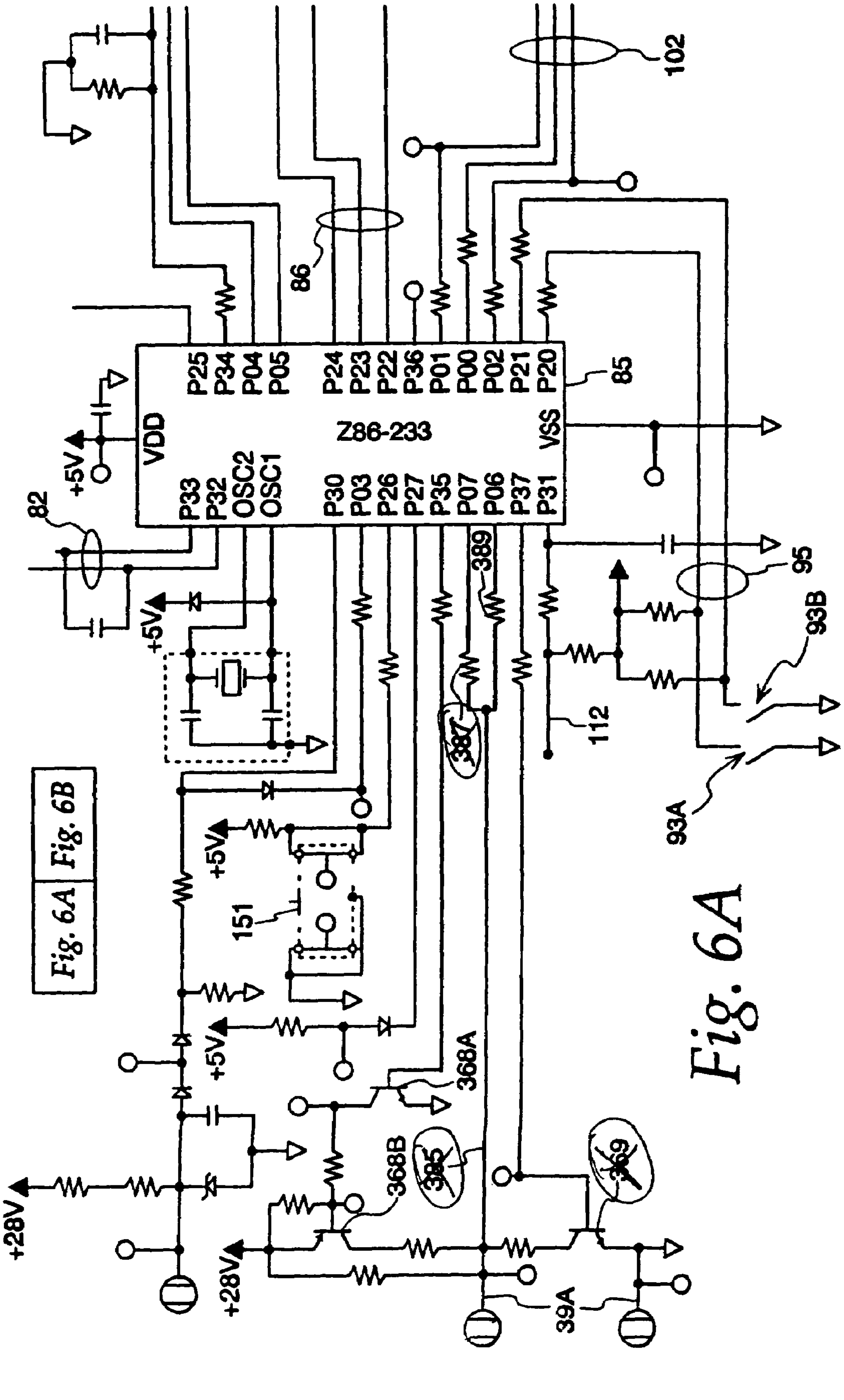
FIGS. 6A and 6B are schematic diagrams of the controller shown in block format in FIG. 3.
Figure 6B:
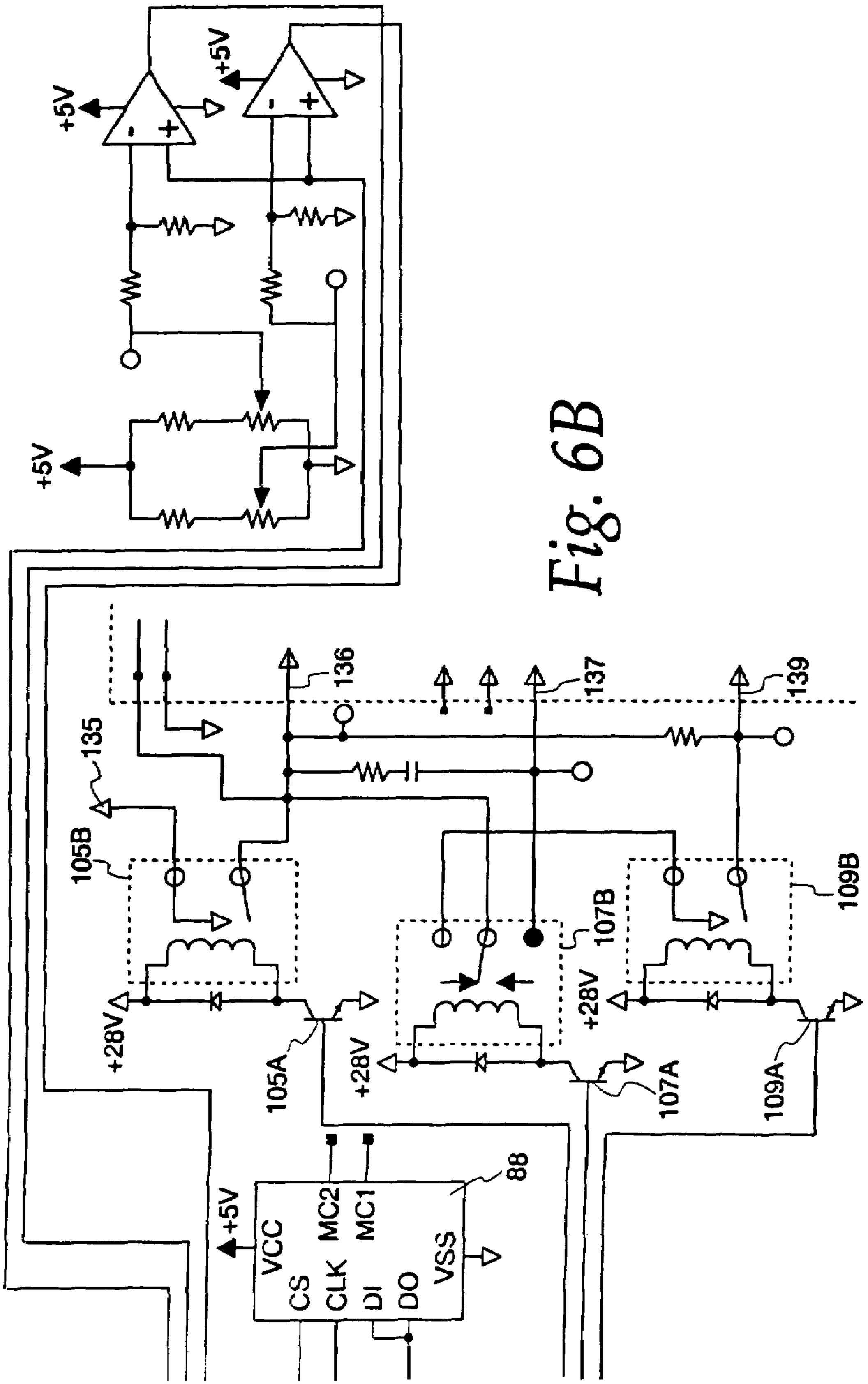

As shown in FIGS. 6A and 6B, microcontroller pin P31 is connected to tachometer 110 via conductor 112. When motor 106 is turning, pulses having a time separation proportional to motor speed are sent on conductor 112. The pulses on conductor 112 are repeatedly scanned by microcontroller 85 to identify if the motor 106 is rotating and, if so, how fast the rotation is occurring.

The apparatus includes an up limit switch 93*a* and a down limit switch 93*b* which detect the maximum upward travel of door 24 and the maximum downward travel of the door. The limit switches 93*a* and 93*b* may be connected to the garage structure and physically detect the door travel or, as in the present embodiment, they may be connected to a mechanical linkage inside head end 12, which arrangement moves a cog (not shown) in proportion to the actual door movement and the limit switches detect the position of the moved cog. The limit switches are normally open. When the door is at the maximum upward travel, up limit switch 93*a* is closed, which closure is sensed at port P20 of microcontroller 85. When the door is at its maximum down position, down limit switch 93*b* will close, which closure is sensed at port P21 of the microcontroller.

The microcontroller 85 responds to signals received from the wall switch 39, the transmitter 30, the up and down limit switches, the obstruction detector and the RPM signal to control the motor 106 and the light 81 by means of the light and motor control relays 104. The on or off state of light 81 is controlled by a relay 105B, which is energized by pin P01 of microcontroller 85 and a driver transistor 105A. The motor 106 up windings are energized by a relay 107B which responds to pin P00 of microcontroller 85 via driver transistor 107A and the down windings are energized by relay 109B which responds to pin P02 of microcontroller 85 via a driver transistor 109A.

Each of the pins P00, P01 and P02 is associated with a memory mapped bit, such as a flip/flop, which can be written and read. The light can thus be turned on by writing a logical "1" in the bit associated with pin P01 which will drive transistor 105A on energizing relay 105B, causing the lights to light via the contacts of relay 105B connecting a hot AC input 135 to the light output 136. The status of the light 81 can be determined by reading the bit associated with pin P01. Similar actions with regard to pins P00 and P02 are used to control the up and down rotation of motor 106.

Pin P26 of microcontroller 85 (FIG. 4) is connected to a grounding program switch 151, which is located at the head unit 12. Microcontroller 85 periodically reads switch 151 to determine whether it has been pressed. Switch 151 is normally pressed to enter a learn or programming mode in order to add a new transmitter to the accepted transmitters last stored in the receiver. When the switch 151 is continuously pressed for 6 seconds or more, all memory settings are overwritten and a complete relearning of transmitter codes and the type of codes to be received is then needed. However, in the system of the present invention, by preprogramming, the microprocessor 85 is instructed to interpret as setting of the auto learn mode the press and hold of the operation button on the original transmitter while energizing a new code transmitter.

In the preferred embodiment of the present invention the auto learn mode is set when the operator receives within a short pre-programmed time two rolling codes from an original transmitter and a new transmitter having correlated fixed identification portions and a one-operation difference between the rolling code portions. In another embodiment, the auto learn mode starts when the door stops in a mid-open position. Also in another embodiment, in order to provide higher security, the auto learn mode starts only after the door is first closed and then opened by the pre-trained transmitter.

Figure 9A:
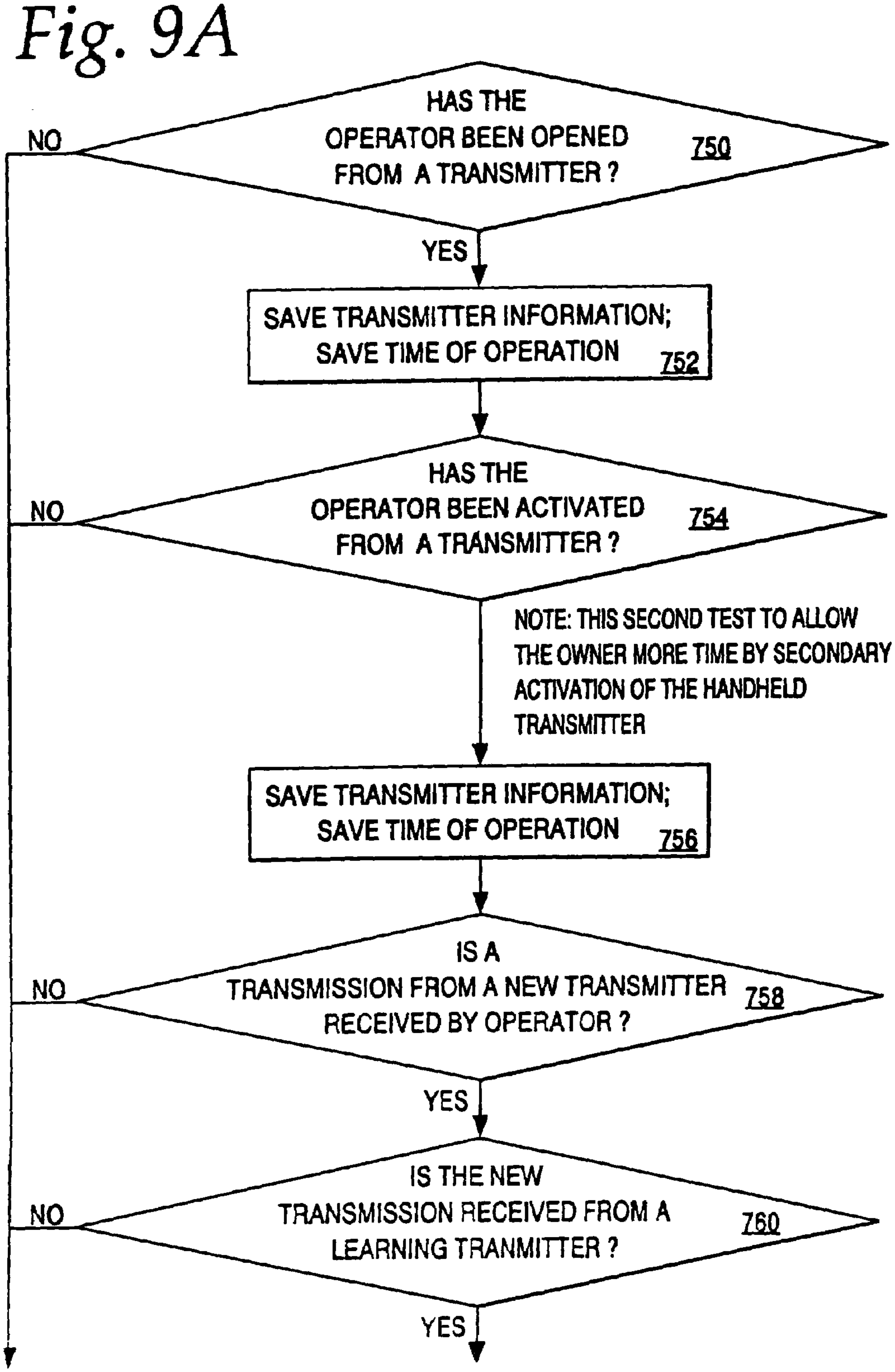
FIGS. 9A-9B are a flow diagram of the auto learn mode.
Figure 9B:
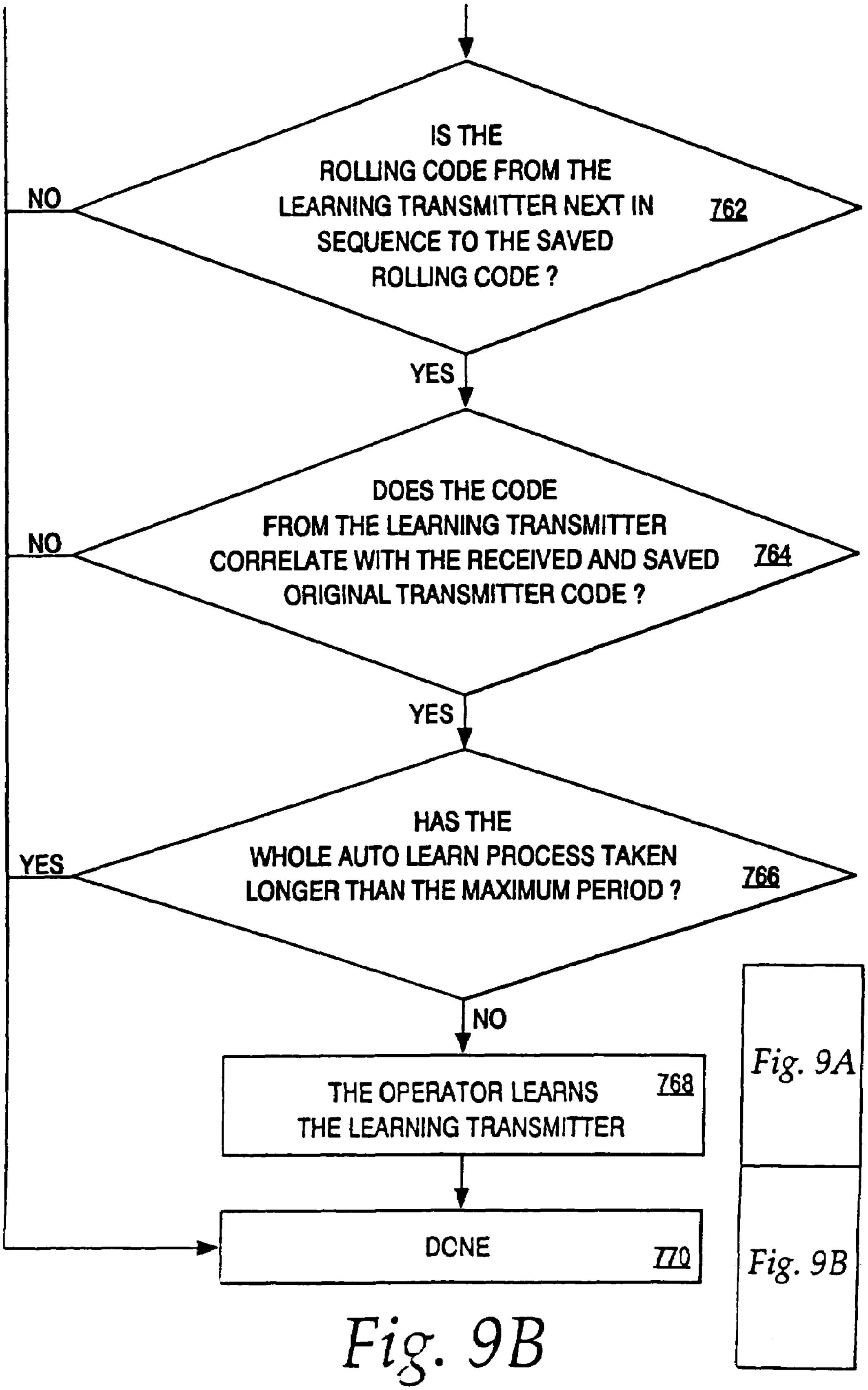

FIG. 9 represents the flow chart of the auto learn method of the present invention.

In step 750, a determination is made whether the operator received an access code from a rolling code transmitter. When step 750 identifies that a rolling code is received, the auto learn mode begins, and step 752 is performed to save information received from the transmitter and time when the code was received. Then the flow proceeds to step 754 to determine if the operator is activated by the access code received from the transmitter. This step gives more time to the owner to activate the handheld transmitter. If the response is positive, the transmitter information and the time of activation is saved for further references in step 756, and in the next step 758 a determination is made whether the operator received a transmission from a new transmitter. If a rolling code transmission is received from a new transmitter, the determination is made in step 760 whether the new transmitter is a learning transmitter. If yes, then the new rolling code is compared with the saved rolling code to determine whether the present rolling code has a one-operation difference with the saved rolling code. If no match is found, flow proceeds to step 770 and the code is rejected and a return is executed to step 750. When step 762 determines that the present rolling code is next in sequence to the past rolling code, in step 764 the fixed identification portion of the present rolling code is compared with the past code fixed identification portions. When no correlation is detected, the flow proceeds to step 770, where the learning process is terminated and a return is executed. When step 764 detects a correlation, flow proceeds to step 766. If not, flow proceeds to step 770. Step 766 determines whether the proper code from the learning transmitter was received within predetermined time limits, e.g. 30 seconds. If the process has taken longer than the maximum predetermined period, the flow goes to step 770. If yes, flow proceeds to step 768 to store the learning transmitter access code into the operator memory.

The performance of step 768 concludes the learning process, which began with setting of the auto learn mode in step 752.

In the present embodiment the brief auto learn mode is entered at any reception of a proper rolling code by the operator. Greater security may be achieved by entering the auto learn mode only after the performance of some other function initiated by the original transmitter. For example, the auto learn mode could be set to start only when a garage door is first closed then raised and stopped on intermediate position in response to commands from the original transmitter.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention. By way of example, the transmitter and receivers of the disclosed embodiment are controlled by programmed microcontrollers. The controllers could be implemented as application specific integrated circuits within the scope of the present invention.

What is claimed is:

1. A method of learning valid security codes by a security code receiver, comprising steps of:

receiving a first security code from a first transmitter;

within a predetermined period of time receiving from a second transmitter a second security code, having a predetermined relationship to the first security code from the first transmitter;

confirming the predetermined relationship by comparing the first security code and the second security code;

in response to confirming the predetermined relationship, storing a representation of the second security code as a valid security code.

2. The method of claim 1 wherein the security code receiver comprises a movable barrier operator.

3. The method of claim 2 wherein the movable barrier operator comprises a garage door opener.

4. A method of learning valid security codes by a security code receiver, comprising steps of:

receiving a first security code from a first transmitter;

within a predetermined period of time, receiving from a second transmitter a second security code having a predetermined relationship that correlates to the first security code from the first transmitter in a defined manner, and storing a representation of the second security code as a valid security code;

wherein the predetermined relationship comprises a correlation between the first security code and the second security code; and wherein the correlation comprises, at least in part, that a rolling code access code portion of the second security code is next in a sequence as determined with respect to a rolling code access code portion of the first security code.

5. The method of claim 4 wherein the correlation comprises, at least in part, a portion of each of the first and second security code that is identical.

6. The method of claim 5 wherein the portion that is identical comprises a fixed identifier.

7. The method of claim 6 wherein the fixed identifier comprises at least one of:

a transmitter number identification;

a transmitter type identification.

8. A method of training a security code transmitter to operate with a security code receiver, comprising, at the security code transmitter to be trained:

receiving at the security code transmitter from an already-trained security code transmitter a security code transmission comprising, at least in part, a fixed identification portion and a rolling code portion;

determining a valid subsequent rolling code portion based upon the rolling code portion;

transmitting to the security code receiver the fixed identification portion and the valid subsequent rolling code portion.

9. The method of claim 8 wherein the security code transmitter comprises a remote control for a movable barrier operator.

10. The method of claim 9 wherein the movable barrier operator comprises a garage door opener.

11. The method of claim 8 wherein determining a valid subsequent rolling code portion based upon the rolling code portion comprises determining a next sequential rolling code portion based upon the rolling code portion.

12. The method of claim 8 wherein transmitting to the security code receiver the fixed identification portion and the valid subsequent rolling coded portion comprises automatically transmitting to the security code receiver the fixed identification portion and the valid subsequent rolling code portion within a predetermined period of time of receiving the security code transmission from the already-trained security code transmitter.

* * * * *

UNITED STATES PATENT AND TRADEMARK OFFICE

CERTIFICATE OF CORRECTION

PATENT NO. : 7,741,951 B2
APPLICATION NO. : 11/216224
DATED : June 22, 2010
INVENTOR(S) : James J. Fitzgibbon It is certified that error appears in the above-identified patent and that said Letters Patent is hereby corrected as shown below:

IN THE CLAIMS:

Column 10, Claim 4, Line 59; change "manner," to -- manner; --.

Signed and Sealed this

Twenty-first Day of September, 2010

David J. Kappos
*Director of the United States Patent and Trademark Office*